US008521703B2

(12) United States Patent
Mewhinney et al.

(10) Patent No.: US 8,521,703 B2
(45) Date of Patent: Aug. 27, 2013

(54) MULTIPLE NODE/VIRTUAL INPUT/OUTPUT (I/O) SERVER (VIOS) FAILURE RECOVERY IN CLUSTERED PARTITION MOBILITY

(75) Inventors: Greg R. Mewhinney, Austin, TX (US); David Nevarez, Austin, TX (US); James A. Pafumi, Leander, TX (US); Jacob Jason Rosales, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 12/940,468

(22) Filed: Nov. 5, 2010

(65) Prior Publication Data

US 2012/0303594 A1 Nov. 29, 2012

(51) Int. Cl.
*G06F 17/30* (2006.01)

(52) U.S. Cl.
USPC .......................................... 707/692; 710/200

(58) Field of Classification Search
USPC .............. 707/692, 802, 821; 718/1; 710/200
See application file for complete search history.

(56) References Cited

U.S. PATENT DOCUMENTS 7,047,337 B2 * 5/2006 Armstrong et al. ........... 710/200
7,730,486 B2 6/2010 Herington
7,865,782 B2 * 1/2011 Terashima et al. .............. 714/43
8,219,990 B2 * 7/2012 Khanna ............................ 718/1
2006/0123024 A1 6/2006 Sathyanarayan
2007/0006226 A1 * 1/2007 Hendel ............................ 718/1
2008/0189468 A1 8/2008 Schmidt
2009/0125904 A1 5/2009 Nelson
2011/0131576 A1 * 6/2011 Ikegaya et al. .................... 718/1
2012/0204175 A1 * 8/2012 Hatta et al. ........................ 718/1

OTHER PUBLICATIONS

IBM PowerVM Live Partition Mobility. 2009.*

* cited by examiner

*Primary Examiner* — James Trujillo
*Assistant Examiner* — Thong Vu
(74) *Attorney, Agent, or Firm* — Yudell Isidore Ng Russell PLLC

(57) ABSTRACT

A system and computer program product utilizes cluster-awareness to effectively support a live partition mobility (LPM) event and provide recovery from node failure within a Virtual Input/Output (I/O) Server (VIOS) cluster. An LPM utility creates a monitoring thread on a first VIOS on initiation of a corresponding LPM event. The monitoring thread tracks a status of an LPM and records status information in the mobility table of a database. The LPM utility creates other monitoring threads on other VIOSes running on the (same) source server. If the first VIOS sustains one of multiple failures, the LPM utility provides notification to other functioning nodes/VIOSes. The LPM utility enables a functioning monitoring thread to update the LPM status. In particular, a last monitoring thread may perform cleanup/update operations within the database based on an indication that there are nodes on the first server that are in failed state.

16 Claims, 10 Drawing Sheets

510

| | SERVER INFO, ID | CLIENT_ID, INFO | VIOS/ NODE STATE |
|---|---|---|---|
| 602 | CEC 110A | LPAR114A, VIOS 112A | RUNNING |
| 604 | CEC 110A | LAPR2, VIOS 612A | CRASHED |
| 606 | CEC110B | LPAR3, VIOS 112D | RUNNING |

FIG. 6

MULTIPLE NODE/VIRTUAL INPUT/OUTPUT (I/O) SERVER (VIOS) FAILURE RECOVERY IN CLUSTERED PARTITION MOBILITY

BACKGROUND

1. Technical Field

The present invention relates in general to clustered data processing systems and in particular to management and utilization of shared storage within a clustered data processing system. Still more particularly, the present invention relates to an improved method and system for node failure recovery based on utilization of shared, distributed storage within a clustered data processing system.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. However, within the virtualization computing environment, storage virtualization and management is implemented as a separate virtualization model from server virtualization and management. Thus, different client logical partitions (LPARs) associated with different virtualized server systems may access the same storage access network (SAN) storage. However, the client LPARs on one server do not have any "knowledge" of whether the storage access network (SAN) disk that the client LPAR is trying to access is being used by some other client LPAR belonging to another server. The conventional implementation of distributed server systems providing storage virtualization within shared SAN storage can cause data integrity issues and may potentially cause data corruption and client partition crashes.

Live partition mobility (LPM) is the practice of moving a virtualized client partition from one server to another without appearing to interrupt operations on the client. However, failures occasionally occur during these LPM events. Unfortunately, conventional approaches have not been effective in handling hardware failures during LPM operations. This is a very complex problem because the state permutations are considerable, and there is no single node that can be relied upon to survive the failure. The traditional approach does not work in the clustered environment because in addition to cleaning up storage resources that were orphaned by the failure, there is not synchronization of relational information for the various nodes. With current approaches, recovery from the failure(s) would require a slow node by node accounting and cleanup process which would limit the function of the cluster (potentially a loss of service for the client partition) for some amount of time.

BRIEF SUMMARY

Disclosed are a system and computer program product for utilizing cluster-awareness to effectively support a Live Partition Mobility (LPM) event and provide recovery from node/Virtual Input/Output (I/O) Server (VIOS) failure within a VIOS cluster. A Live Partition Mobility (LPM) utility creates a monitoring thread on a first VIOS upon initiation of a corresponding LPM event. The monitoring thread tracks the status of an LPM event and records status information in the mobility table of a database. The LPM utility creates other monitoring threads on other VIOSes running on the (same) source computing electronic complex (CEC). If the first VIOS sustains one of multiple failure conditions (e.g., the VIOS can no longer perform I/O operations, goes offline or is removed from the cluster), the LPM utility provides notification to other functioning nodes/VIOSes. The LPM utility enables a functioning monitoring thread to update the LPM event status. In particular, a last monitoring thread may perform update operations within the database based on indication that there are nodes on the first server that are in a failed state.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein:

FIG. 6 illustrates a mobility table that is updated by a monitoring thread during an LPM event, according to one embodiment;

DETAILED DESCRIPTION

Figure 1A:
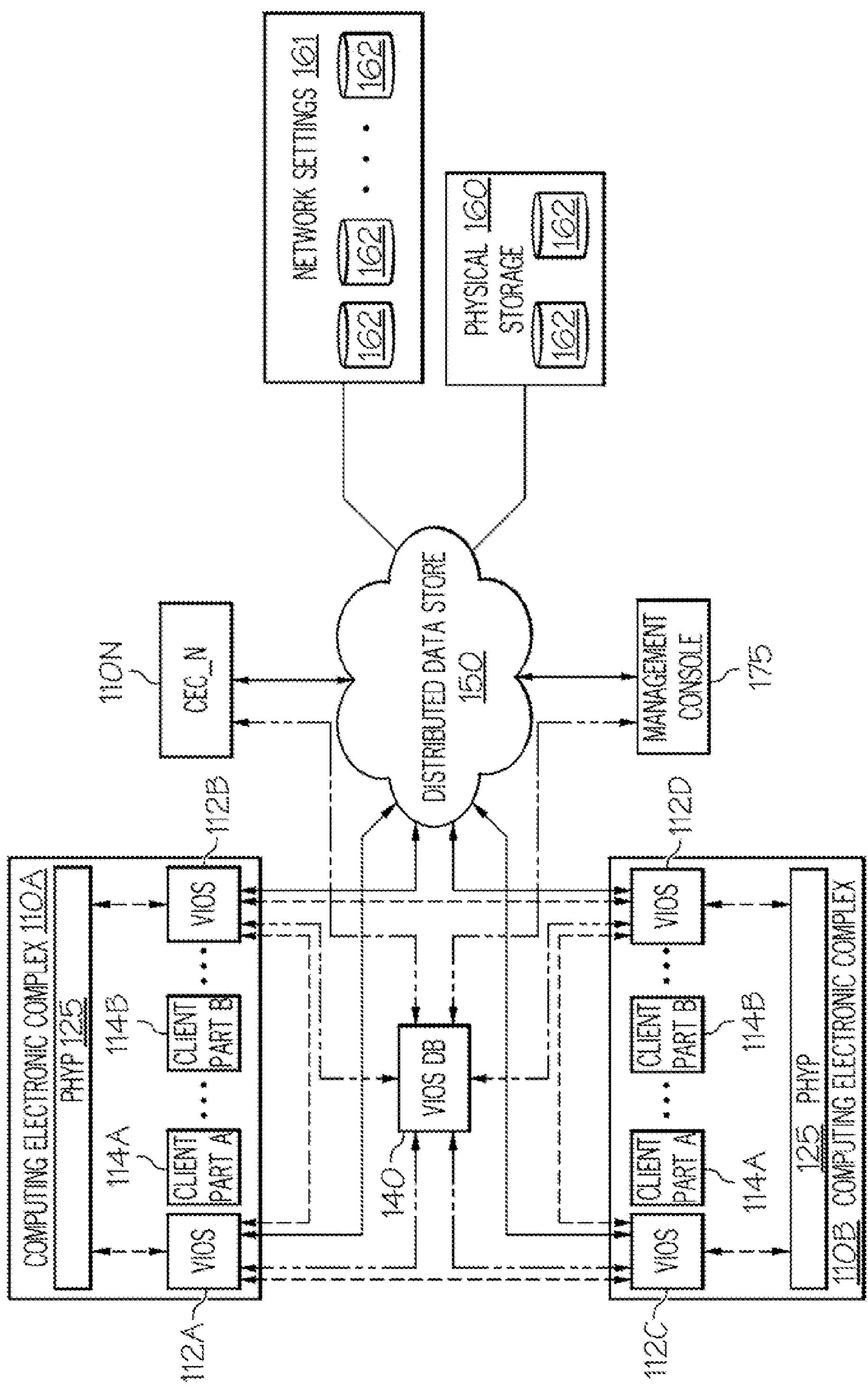
FIG. 1A illustrates a first view of a cluster (aware) data processing system within which various of the functional features of the described embodiments are implemented, according to one embodiment.

The illustrative embodiments provide a method, data processing system, and computer program product for utilizing cluster-awareness to effectively support a live partition mobility (LPM) event and provide recovery from node failure within a Virtual Input/Output (I/O) Server (VIOS) cluster. A Live Partition Mobility (LPM) utility creates a monitoring thread on a first VIOS upon initiation of a corresponding LPM event. The monitoring thread tracks the status of an LPM event and records status information in the mobility table of a database. The LPM utility creates other monitoring threads on other VIOSes running on the (same) source computing electronic complex (CEC). If the first VIOS sustains one of multiple failure conditions (e.g., the VIOS can no longer perform I/O operations, goes offline or is removed from the cluster), the LPM utility provides notification to other functioning nodes/VIOSes. The LPM utility enables a functioning monitoring thread to update the LPM event status. In particular, a last monitoring thread may perform update operations within the database based on indication that there are nodes on the first server that are in a failed state.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
B. Cluster-Aware VIOS
C. CA VIOS Communication Protocol
D. VIOS Shared DB for Cluster Management
E. VIOS Cluster Mobility
F. Failure Recovery During Clustered Partition Mobility A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114*a* and clientB 114*b*, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed data store 150, and the distributed data store 150 enables several of the client level functional features provided by the embodiments described herein. Distributed data store 150 is a distributed storage facility providing a single view of storage that is utilized by each CEC 110 and for each client 114 of each CEC 110 within a cluster-aware, distributed system. Distributed data store 150 comprises local physical storage

160 and network storage 161, both of which comprise multiple physical storage units 162 (e.g., disks. solid state drives, etc.). The physical disks making up distributed data store 150 may be distributed across a storage network (e.g., a SAN). Additionally, distributed data store 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed data store 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed data store 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to Distributed data store 150 via CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112*a*) of a first CEC to a second VIOS (e.g., VIOS 112*b*) on the same CEC, the various interconnects represent a network level connectivity between the VIOS nodes of the cluster and the DB 140 and the distributed data store 150. As utilized herein, references to one or more "nodes", are assumed to refer specifically to a VIOS within the cluster. DPS 100 also comprises a management console 175 on which a management tool (not shown) executes.

Figure 1B:
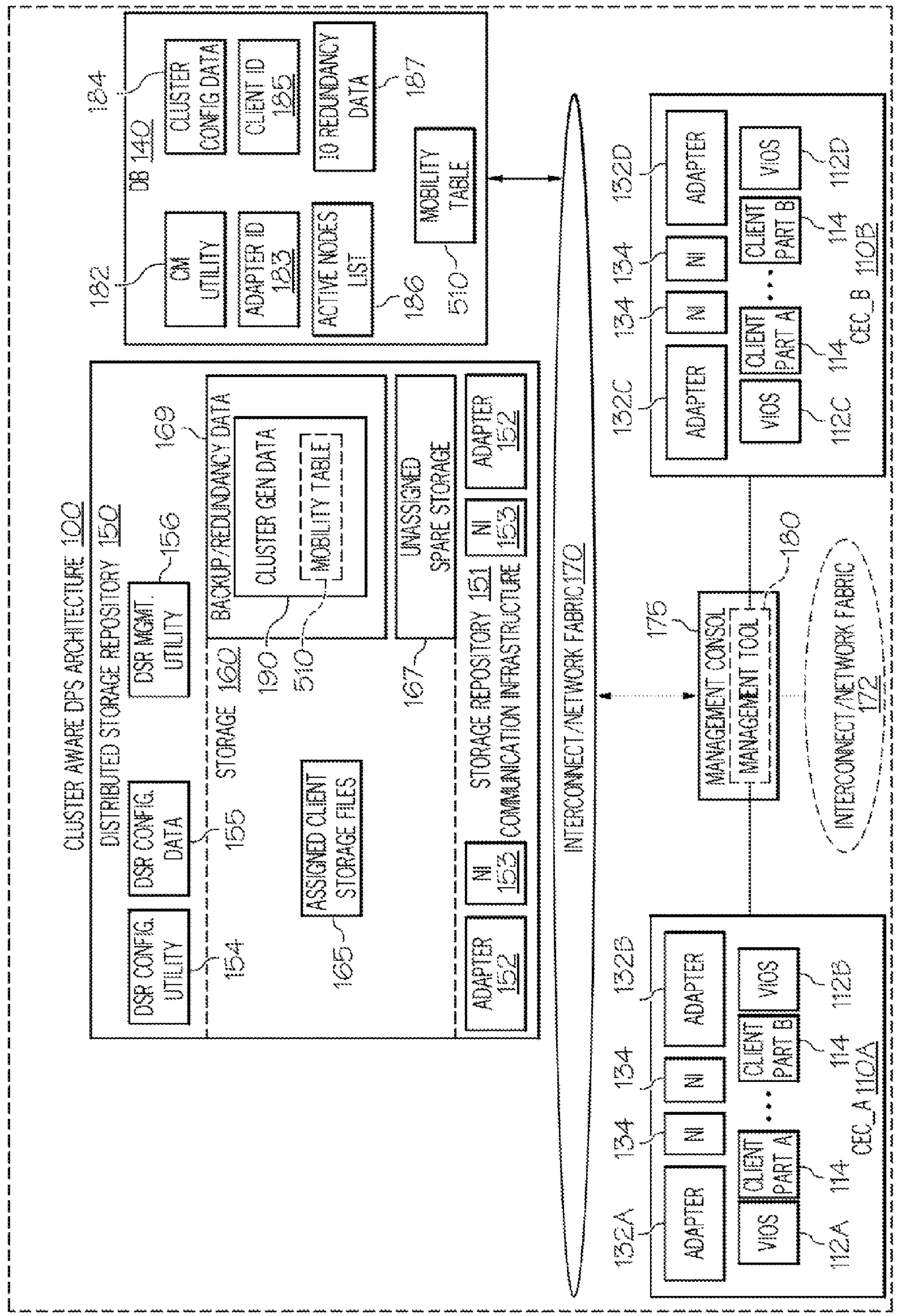
FIG. 1B illustrates a second view of the cluster data processing system (DPS) of FIG. 1 depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

As depicted, each CEC 110 comprises one or more network interfaces 134 and one or more I/O adapters 132 to enable the CEC 110 and thus the other components (i.e., client partitions) of the CEC 110 to engage in network level communication. Each VIOS 112 emulates virtual client I/O adapters 226*a*-22*c* to enable communication by specially-assigned client LPARs 114*a*-114*c* with distributed storage repository 150 and/or other clients, within the same CEC or on a different CEC. The VIOSes 112 emulate these virtual I/O adapters 226*a*-226*c* and communicates with distributed storage repository 150 by connecting with corresponding virtual sever I/O adapters (SVA) 152*a*-152*c* at distributed storage repository 150. Internal CEC communication between VIOS 112 and client LPARs 114*a*-114*c* are illustrated with solid connecting lines, which are routed through the virtualization management component, while VIOS to server communication is provided by dashed lines, which connect via the network/interconnect fabric 172. Management console 175 is utilized to perform the setup and/or initialization of the backup and restore operations described herein for the individual VIOSes 112 and/or of the VIOS cluster as a whole, in various embodiments. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

Also illustrated by FIG. 1B is an initial view of the component make-up of an example distributed storage repository 150 and an initial listing of some components of DB 140. To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

Figure 4A:
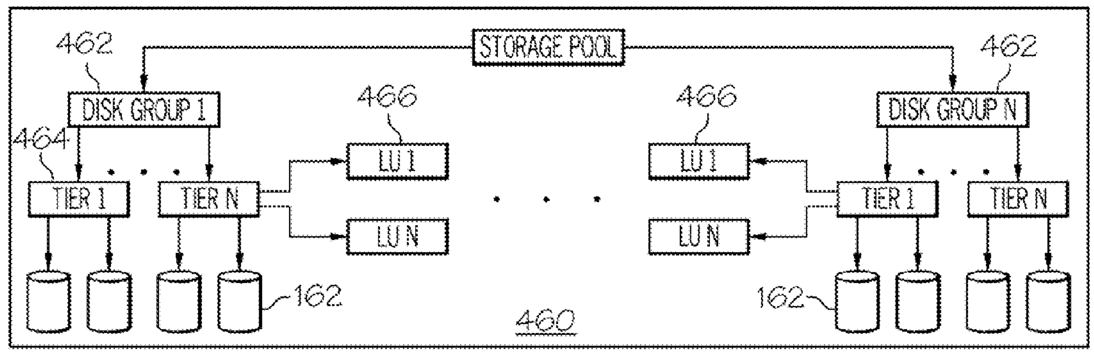
FIG. 4A is a block diagram representation of a storage pool associated with and utilized by a VIOS cluster within a CA_DPS, according to one embodiment.

As shown, distributed data store 150 generally comprises general storage space 160 (the available local and network storage capacity that may be divided into storage pools) providing assigned client storage 165 (which may be divided into respective storage pools for a group of clients), unassigned, spare storage 167, and backup/redundant CEC/VIOS/client configuration data storage 169. In one embodiment, the assigned client storage is allocated as storage pools, and several of the features related to the sharing of a storage resource, providing secure access to the shared storage, and enabling cluster-level control of the storage among the VIOSes within a cluster are supported with the use of storage pools. When implemented within a VIOS cluster, storage pools provide a method of logically organizing one or more physical volumes for use by the clients supported by the VIOSes making up the VIOS cluster. FIG. 4A illustrates an example configuration of a storage pool utilized within a cluster aware DPS 100. Specifically, FIG. 4A provides details on how these physical volumes are used within the storage pool. As shown, storage pool 460 within the cluster contains one or more Disk Groups 462. Disks Groups 462 provide administrators the ability to provide access policies to a given subset of physical volumes 162 within the storage pool 460. Once a disk group 462 has been defined, administrators can further categorize the subset into Storage Tiers 464 based on disk characteristics. Once a Disk Group 462 and Storage Tier 464 have been defined, administrators carve Logical Units (LU) 466 to be exported to client partitions (114).

With the capability of virtual pooling provided herein, an administrator allocates storage for a pool and deploys multiple VIOSes from that single storage pool. With this implementation, the SAN administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers.

As illustrated, DSR 150 further comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, DPS 100 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. In the present embodiment, VIOS DB 140 also comprises a mobility table 510 by which the nodes of the VIOS cluster are able to track and support movement and/or re-location of VIOS partitions and/or client partitions within the VIOS cluster. Additional features of DB 140 and distributed storage repository 150 as well as the specific components or sub-components that enable the various clustering functionality are presented within the description of the remaining figures and throughout the description of the various presented embodiments.

The various data structures illustrated by the figures and/or described herein are created, maintained and/or updated, and/or deleted by one or more operations of one or more of the processing components/modules described herein. In one embodiment, the initial set up of the storage pools, VIOS DB 140 and corresponding data structures is activated by execution of a cluster aware operating system by management tool 180 and/or one or more VIOSes 112. Once the infrastructure has been established, however, maintenance of the infrastructure, including expanding the number of nodes, where required, is performed by the VIOSes 112 in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster. In one embodiment, management tool 180 registers with a single VIOS 112*b* and is thus able to retrieve/receive cluster-level data from VIOS, including FFDC data (191) of the entire cluster.

Figure 2A:
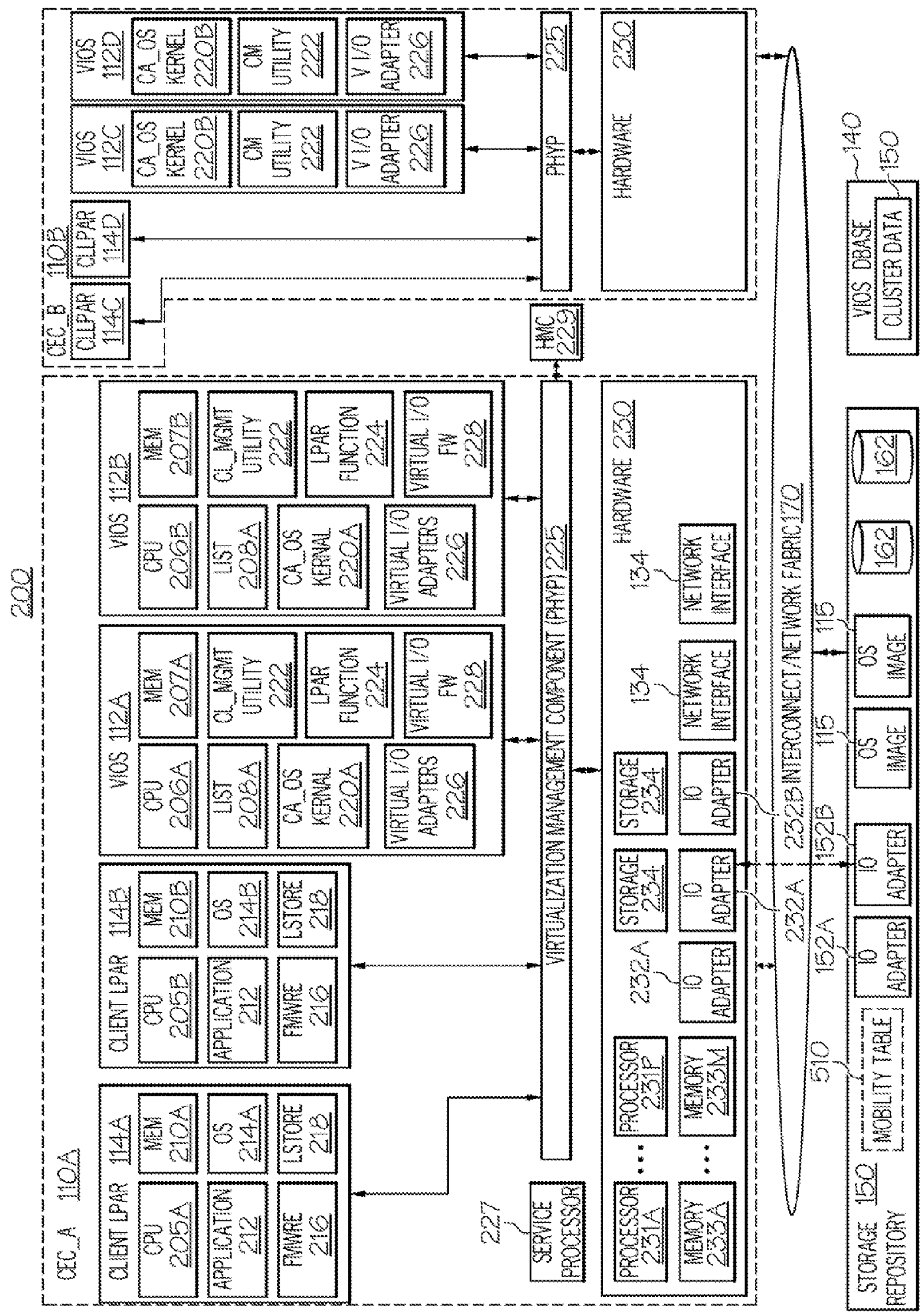
FIG. 2A illustrates an internal configuration of a computing electronic complex (CEC) within the cluster DPS having virtualized OS partitions, including virtual I/O server (VIOS) partitions, according to one embodiment.

With reference now to FIG. 2A, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2A and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage

234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions. In one or more embodiments, configuration data related to the virtualized adapters and other components that are assigned to the VIOSes (or the clients supported by the specific VIOS) are maintained within each VIOS and may be maintained and updated by the VIOS OS, as changes are made to such configurations and as adapters are added and/or removed and/or assigned.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. HMC 229 is one possible implementation of the management console 175 illustrated by FIGS. 1A-1B, and the use of HMC 229 specifically within this illustration is solely for illustration of one actual embodiment among several available options. Operations of the different logical partitions may be controlled through HMC 229, which is a separate data processing system from which a system administrator may perform various functions, such as reallocation of resources to different logical partitions. Importantly, features related to backup and restoration of OS partitions and in particular of the VIOSes and the VIOS cluster are controlled through the HMC, in the present embodiment, but those features are described more generally with reference to the management console 175 in the various other embodiments presented herein.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports virtual real memory and virtual shared storage functionality (with access to distributed storage repository 150) as well as clustering functionality. Relevant VIOS data and cluster level data are stored within local storage (L_ST) 208 of each VIOS 112. For example, in one embodiment VIOS configuration data of the local VIOS hardware, virtual and logical components. Additionally, local storage (L_ST) 208 comprises cluster configuration data 184, cluster state data 185, active nodes list 186.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B, 2A and 2B may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices and grants access to Distributed data store 150 in cooperation with the PHYP 225. Configuration of the VIOS is performed through the hardware management tools of HMC 229. SCSI storage devices support a set of commands that allow SCSI initiators the ability to control access to storage. Data base programs, for example, may manage access to distributed data store 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to Distributed data store 150. The client LPAR 114, however, uses the virtual SCSI device drivers. In one embodiment, the VIOS 112 also provides disk virtualization for the client LPAR by creating a corresponding file on distributed data store 150 for each virtual disk. The VIOS 112 allows more efficient utilization of physical resources through sharing between client LPARs, and supports a single machine (e.g., CEC 110) to run multiple operating system (OS) images concurrently and isolated from each other.

Figure 2B:
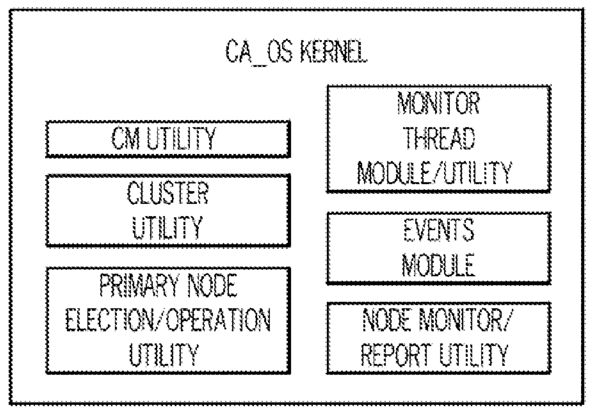
FIG. 2B is a block diagram illustration of functional components/modules of a cluster aware operating system utilized within a VIOS, according to one embodiment.

As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. In one or more embodiments, the VIOS operating system (s) is an enhanced OS that includes cluster-aware functionality and is thus referred to as a cluster aware OS (CA_OS). One embodiment, for example, utilizes cluster aware AIX (CAA) as the operating system. CA_OS 220 manages the VIOS LPARs 112 and enables the VIOSes within a cluster to be cluster aware. FIG. 2B illustrates an example CA_OS kernel 220 with several functional modules, according to one embodiment. In the illustrative one embodiment, CA_OS kernel 220 comprises cluster management (CM) utility 222 which supports the VIOS configuration for cluster-level functionality. Also illustrated within CA_OS 220 are primary node election/operation utility 182, node monitoring and reporting utility 183, and Events module 181, among others. Each of these additional software components may be a functional module within CM utility, in one embodiment, and are described as such throughout the remainder of this specification. In one embodiment, CM utility 222 may be a separate utility that is locally installed or downloaded (from DB 140, for example) as an enhancement to an existing OS within a CEC 110. CM utility 222 is then executed when configuring VIOS to join a cluster and become a cluster-aware node within the cluster, and CM utility enables the OS to support the various cluster-awareness and other cluster-level features and functionality. In an alternate embodiment, CA_OS 220 includes all the clustering features and functionality and rolls out the various features when the CEC 110/VIOS 112 joins the cluster and/or during configuration of VIOS 112 to become cluster-aware.

According to one embodiment, cluster-awareness enables multiple independent physical systems to be operated and managed as a single system. When executed within one or more nodes, CA_OS 220 enables various clustering functions, such as forming a cluster, adding members to a cluster, and removing members from a cluster, as described in greater detail below. In one embodiment, CM utility 222 may also enable retrieval and presentation of a comprehensive view of the resources of the entire cluster. It is appreciated that while various functional aspects of the clustering operations are described as separate components, modules, and/or utility and associated data constructs, the entire grouping of different components/utility/data may be provided by a single executable utility/application, such as CA OS 220. Thus, in one embodiment, CA_OS executes within VIOS 112 and generates/spawns a plurality of functional components within VIOS 112 and within DB 140. Several of these functional components are introduced within FIG. 1B, and others are described throughout the various embodiments provided herein. For simplicity in the descriptions which follow, references to cluster management utility and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed data store 150 and/or DB 140. Virtual I/O adapter (s) 226 and CM utility 222 also enable the VIOS 112 to provide each client LPAR 114 with access to the full range of storage accessible within distributed data store 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112*a* (through a communication channel established via PHYP 225), grants access to another VIOS 112*b* through one or more virtual adapters. VIOS 112 includes the functionality to query PHYP 225 for the identity of the Client LPAR 114 on the CEC 110 where the VIOS 112 is currently running C. CA VIOS Communication Protocol One embodiment provides a communication protocol that enables efficient communication between the Clients 114 and distributed data store 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed data store 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed data store 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 3:
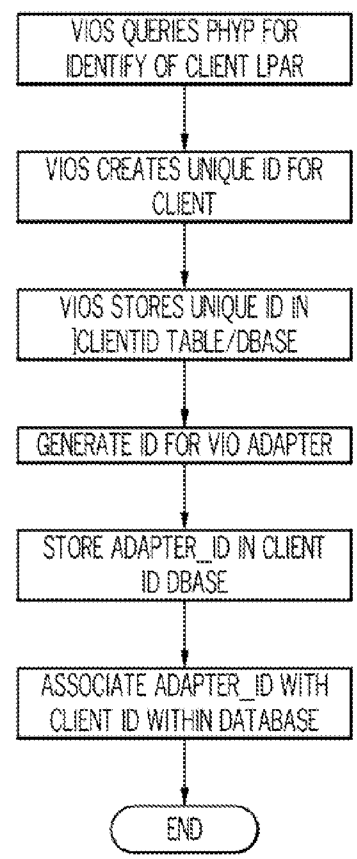
FIG. 3 is a flow chart of the method by which the process of client creation and registration is completed within a CA_DPS, according to one embodiment.
Figure 4B:
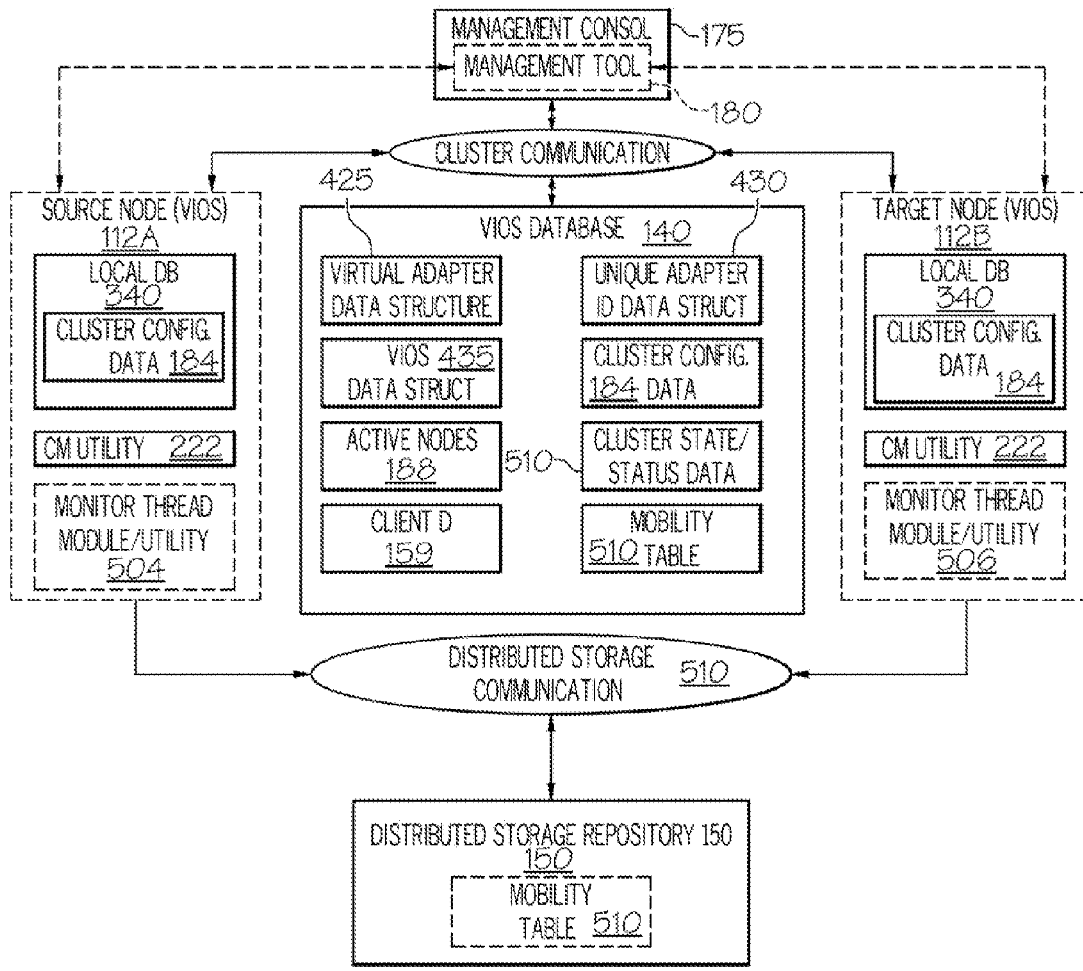
FIG. 4B is a block diagram representation of stored data structures and other functional components within a VIOS DB including source node and target node components, which enable cluster level information/data management and exchange between a management tool, a source node, second/target node and the shared database, according to one embodiment.

According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed data store 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 1B) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapaterID data structure 158 (block 310) and are associated with their corresponding clientIDs (block 312). The method illustrated by FIG. 3 ends at termination block 314, with each clientID having been associated with the corresponding one or more vio AdapterIDs with DB 140. FIG. 4B described below illustrates these data structures as well as several of the other components stored within DB 140.

VIOS SCSI emulation code (an executable module provided by VIO software utility 228) utilizes the vioAdapterID to emulate reserve commands. Secure access to storage pools are managed by the unique ClientID, which is provided on an access list associated with each storage pool. In one embodiment, the VIOS 112 supports commands that are invoked as part of moving a client LPAR 114 from a first (source) CEC (110A) to a second (destination) CEC (110B) in a cluster environment. The commands generate data streams describing the virtual devices, which include the vio Adapter information. That information is used to modify the ClientID database 159 so that the identity of the Client on the destination CEC (110B) is associated with the unique ClientID of that client, and the unique identifiers of the VIO adapters (VIO AdapterIDs) on the source CEC (110A) are inherited by the I/O adapters on the destination CEC (110B).

D. VIOS Shared DB for Cluster Management

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the corresponding ODM entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local mode is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

FIG. 4B is a block diagram representation of functional components of a source node, a target node and shared storage (DB 140) to enable cluster level information/data storage, management and exchange between the nodes and VIOS shared storage (DB 140) during cluster level operations, including a live partition mobility operation. In one embodiment, a local copy of DB 140 is shared by each VIOS within the cluster. Each VIOS is then responsible for storing, maintaining and updating the data structures at DB 140 in one embodiment. As illustrated by FIG. 4B, DB 140 is accessible to the various VIOS nodes 112 and to management tool 405. Database 140 comprises several different modules of data, which may be arranged in a plurality of formats (e.g., tables, raw data, sequenced data, etc.) According to the figure, DB 140 includes a virtual adapter data structure 425, which maintains a listing of and configuration information about the virtual adapters. DB 140 also includes a second data structure 430 that holds the unique adapter identifiers (AdapterIDs), and is therefore referred to herein as AdapterID data structure 430. DB 140 maintains a listing of and information about the VIOSes within a VIOS data structure 435. In one or more embodiments, each of the described data structures 425-435 can be or can include a table within DB 140. VIOS DB 140 also includes a mobility table 510. In one embodiment a copy of the mobility table can be maintained at distributed storage repository 150.

When a virtual adapter is first discovered, the cluster management (CM) utility 122 (FIG. 1B) creates a row within the virtual adapter data structure 425 and a row within the unique AdapterID data structure 430. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. The kernel extension is passed the AdapterID and utilizes the AdapterID to identify the IT Nexus, thus allowing the VIOS cluster to limit access to storage based on the reserve commands. This scheme allows software designed to access physical devices (e.g., SCSI devices) to operate with security, without requiring any modification. This scheme further allows the customer to have access to a full suite of existing software solutions that are familiar to system administrators. The kernel extension is also tasked with sending a message through a socket once the kernel discovers the identity of a VIOS on VIOS login. The VIOS uses a SCSI standard login command, which is part of a protocol known as SRP. The SRP protocol is emulated over the PHYP transport layer by the VIOS. The SRP login can be use as a trigger to send a command over a socket with the CEC relative identity of the VIOS. A message is sent back to the kernel extension once the message is processed. The message triggers access to DB 140, which access checks if the VIOS is known. If the VIOS is not known within the cluster, a unique identifier is assigned to the VIOS and a row is inserted in the VIOS data structure 435 within DB 140. The created adapter row of the adapter data structure 425 in DB 140 is associated with this row of the VIOS data structure 435. The management tool validates that the VIOS has access rights to the storage pools in use by the adapter to emulate logical units. In the described embodiments, the kernel extension does not allow I/O access to logical units making use of restricted storage pools until the VIOS identity is verified.

Among the principal functional features of the illustrative embodiments is the ability to cluster the VIOSes 112 of the various CECs 110 within the DPS 100 (FIG. 1A-1B). Additionally, VIOS provides clustering services that can be exposed to have operations be invoked not only on the local VIOS, but on remote nodes without the consumer being aware of such actions. The introduction of these technologies requires the consumers, namely a management tool, to be able to understand what capabilities a VIOS currently is running with when the VIOS is part of a cluster, and what the VIOS is potentially capable of running FIG. 4B illustrates the communication between a management tool 180, such as Systems Director of IBM Corporation, according to one embodiment, and the VIOS nodes within the DPS 100.

E. VIOS Cluster Mobility

According to one or more embodiments, the algorithms/functional software modules provided by CM utility 222 also account for the VIOS moving from a first CEC, referred to herein as the source CEC, to a second CEC, referred to herein as the destination or target CEC. One of the roles played by the VIOS in enabling performance of a mobility operation within the cluster aware DPS 100 is to describe the storage that is in use on the source CEC to the VIOS on the destination CEC. The description provide by the first VIOS 112*a* includes a key into an adapter table for the source adapter. The key is utilized to find the client (114) and unique AdapterID information, based on the data base relationship (e.g., the association of data structures (e.g., tables) within the database). The unique AdapterID is passed to the kernel extension, which verifies storage access. The PHYP signals the termination of the mobility operation, and as part of that completion, the row within the VIOS table is updated with the new CEC relative identifier. Thus, while the move of the particular LPAR is completed, the unique AdapterID assigned to that OS partition is not changed within the database (distributed storage repository 150). The CEC relative identifier allows the VIOS to be discovered, while the unique AdapterID allows secure implementation of storage pool access rights. This scheme allows flexibility in the management tools implementation for pool security allowing for convenience of use by the system administrator.

F. Failure Recovery During Clustered Partition Mobility

In one implementation, certain functional components of CM utility 222 are encoded on local device storage accessible to corresponding VIOS 112, such that the VIOS 112 is able to immediately register with the cluster and retrieve/download or have forwarded from DB 140 (on successful registration with the cluster) the necessary CM software, information and/or data to become cluster aware when the VIOS is initially activated within the CEC 110. In addition to the locally stored software utility components of CM utility 222, other functional components of CM utility 222 may be downloaded from DB 140 when CEC is powered on or when one or more VIOSes 112 and/or one or more new client LPARs 114 are enabled on CEC 110. Additionally, according to the presently described embodiments, and additional utility is provided on the CEC to enable failure recovery during live partition mobility. The live partition mobility (LPM) utility executes within a CEC from which a client partition is undergoing a live mobility operation from a source VIOS on the first CEC to a target VIOS on a second CEC. The LPM utility activates a LPM module (of CM utility of CA_OS) within the source VIOS and one or more other VIOSes of the cluster, including the target VIOS.

Figure 5A:
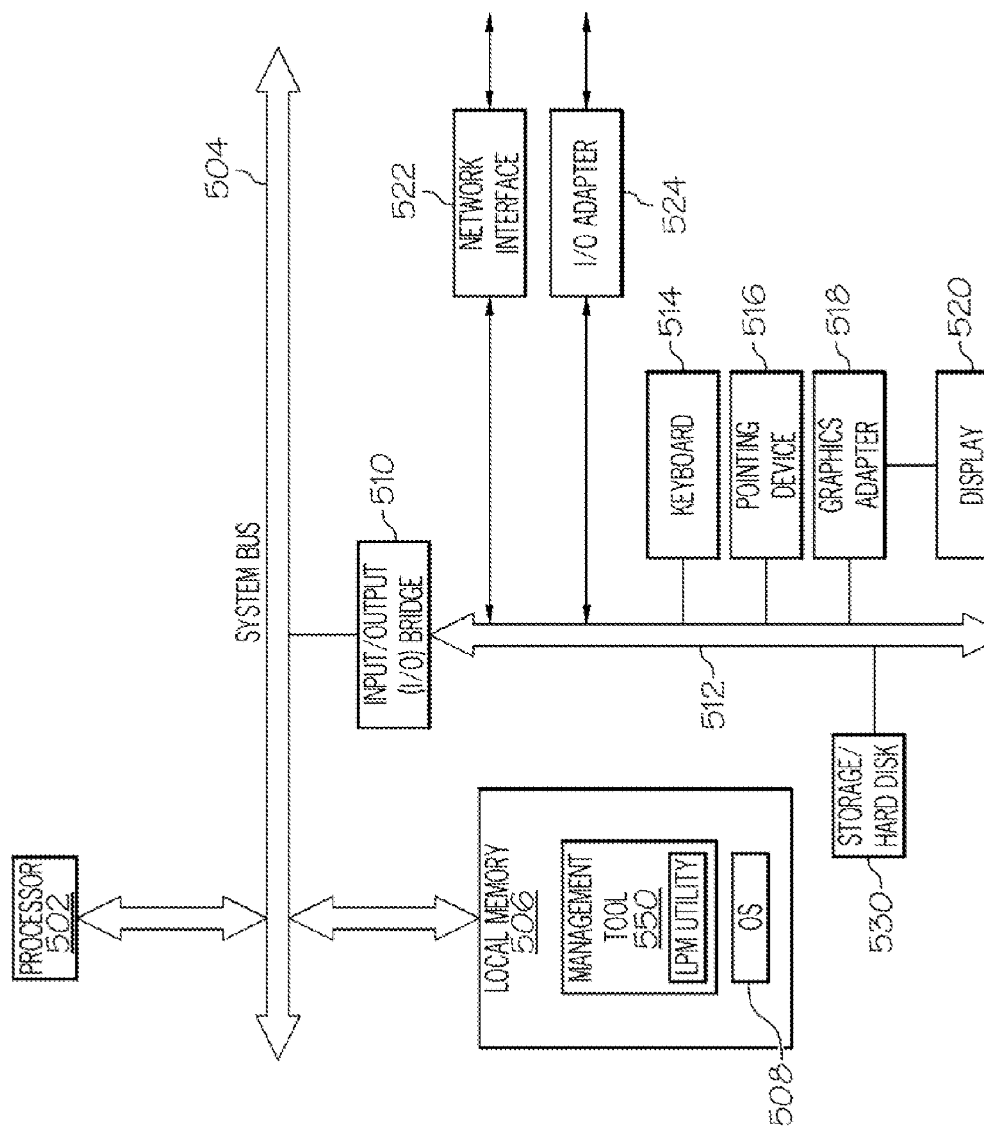
FIG. 5A is a block diagram representation of a data processing system that provides the functionality of a management console with hardware and software components that can be utilized to initiate and support live partition mobility within A VIOS cluster, according to one embodiment.
Figure 5B:
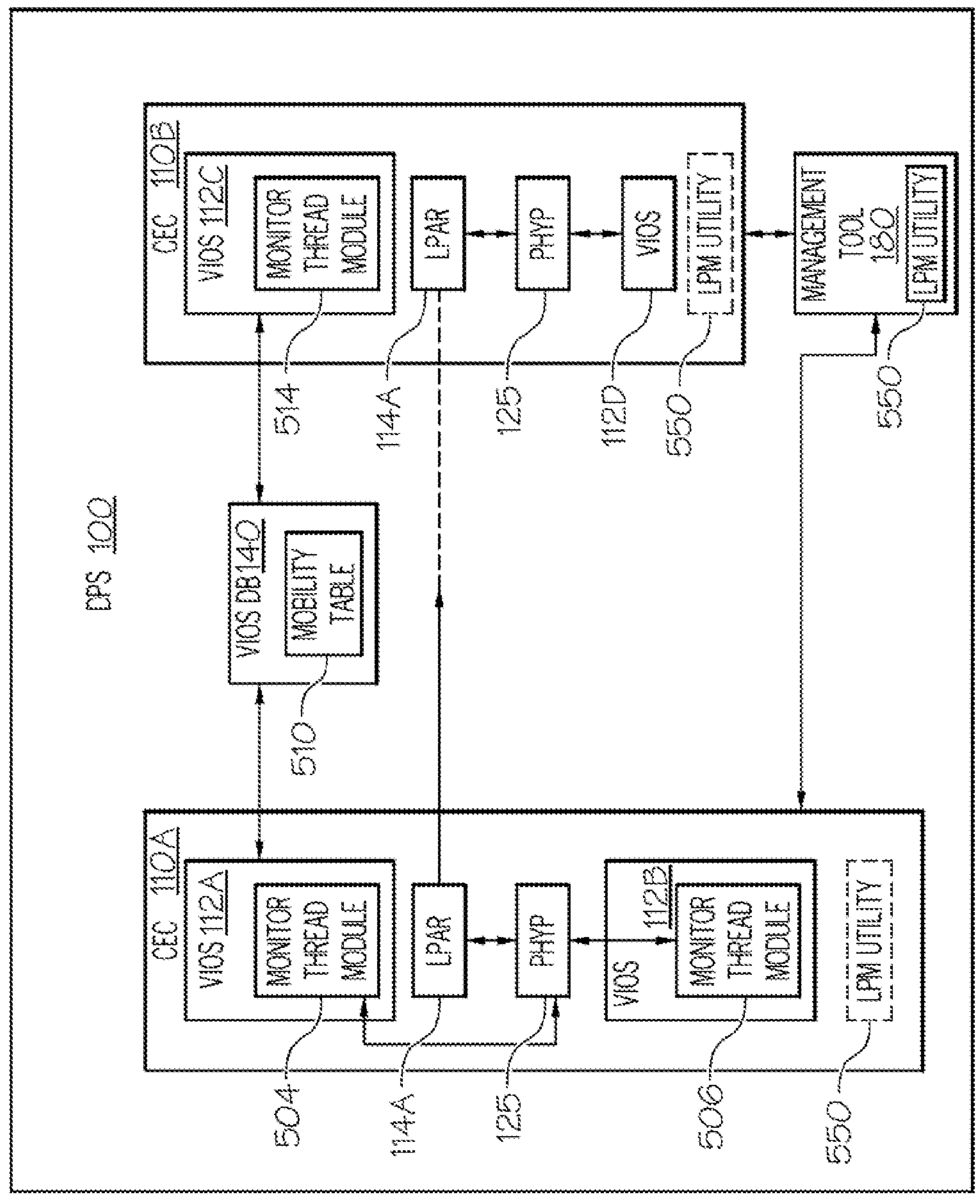
FIG. 5B illustrates a VIOS cluster environment with two CECs and multiple VIOSes that are configured to effectively support a Live Partition Mobility (LPM) event, according to one embodiment.

According to one or more embodiments, and as illustrated by FIGS. 5A and 5B, the LPM utility 550 is implemented as a part of the management tool 180 and/or from the management console 175. Other embodiments can provide for the LPM utility to be located within or associated with the PHYP 225. Referring now to FIG. 5A, there is illustrated a data processing system with hardware and software components that can be utilized to initiate and support live partition mobility within A VIOS cluster, according to one or more embodiments. The illustrated processing system provides/supports the functionality of an example management console and is therefore referred to herein as management console 175, for consistency. It is appreciated that the physical configuration of management console 175 may be different from that illustrated in FIG. 5A, and the specific configuration presented herein is provided for illustrative purposed only.

As illustrated, management console 175 comprises a processor 502, which is communicatively coupled to local memory 506 and I/O controller/bridge 510 via system bus/interconnect 504. I/O controller/bridge 510 has an associated I/O bus to which is connected one or more I/O devices, of which keyboard 514 and pointing device 516 (e.g., mouse), and display 520 are illustrated. Display 520 connects to I/O bus 512 via a graphics/display adapter 518. Also connected to I/O bus 512 are network interface 522 and I/O adapter 524. Network interface enables connection to an external network, such as is illustrated by network fabric 170 (FIGS. 1A-1C). I/O adapter 524 can be any I/O adapter that enables I/O interfacing with an I/O device and/or another data processing system, such as CEC 110 (FIGS. 1A-1C and 2). Management console 175 further includes a storage device 530 within which instructions/code/data related to processes on the management console may be stored.

In addition to these hardware components, located within local memory 506 are a plurality of software components that enable management console 175 to function as a management device within a VIOS cluster environment. Among these software components are local OS 508 and management tool 180. Management tool 180 as previously described supports/provides certain of the functions related to management of a VIOS cluster, including initiating the set up the individual client LPARs, assigned to specific clients, and overall management functions associated with the client LPARs and the VIOSes on a CEC or within the VIOS cluster. Specific to the presently described embodiments, management tool 180 provides/comprises LPM utility 550, which executes on processor 502 to provide a plurality of functions associated with the live partition mobility operations within a VIOS cluster. Communication of the management tool 180 (and/or LPM utility 550) functions to the VIOSes can be accomplished via the virtualization management component 225, in one embodiment. In the provided embodiments, some of the features of LPM utility 180 can be provided within the VIOSes as well, and the embodiments are described without specific limitation on whether the features are implemented on the management console 175 or on a VIOS 112 to which the management tool is communicatively connected.

In one embodiment, LPM utility 550 provides code/program instructions that are executed on one or more virtual processor resources of one or more VIOSes 112 within CEC 110 and/or on processor 502 of management console 175 to provide specific functions. Among the functionality provided when LPM utility 550 is executed and which are described in greater detail herein are the following non exclusive list: (a) creating a first monitoring thread on a first VIOS to track the status of an LPM event; recording information about the LPM event within a database by using said first monitoring thread; (b) identifying a first set of functioning monitoring threads that continue to function on a first, source server if the first VIOS and the first monitoring thread is crashed; (c) determining whether the first set of functioning monitoring threads is a single, last monitoring thread; and (d) if there are nodes on the first server exhibiting one or more of multiple pre-identified failure conditions (from among the non-exclusive list of (a) the VIOS can no longer perform I/O operations, (b) the VIOS goes offline or (c) the VIOS is removed from the cluster, performing, via the last monitoring thread, update operations within the database based on indication that there are nodes on the first server that are in a crashed state.

Turning now to FIG. 5B, there is illustrated an example VIOS cluster (i.e., a cluster aware collection of VIOSes) that is configured to effectively support a Live Partition Mobility (LPM) event, according to one embodiment. According to one or more embodiments, the algorithms/functional software modules provided by LPM utility 550 also account for the migration of one LPAR (e.g., LPAR 114A) from source CEC 110A to target/destination CEC 110B. Each VIOS within the VIOS cluster (DPS 100) can be considered a node in the cluster.

In response to detecting the start of an LPM event, LPM utility 550 initiates the creation of a first monitoring thread (e.g., by using monitor thread module 504) on first VIOS 112A corresponding to the LPM event. The LPM event specifically refers to the transfer of LPAR 114A on CEC 110A (i.e., a first, source server) to CEC 110B (i.e., a second, target server) within the same VIOS cluster (DPS 100). First VIOS 112A runs on the source server (e.g., CEC 110A) from which the client/LPAR 114A currently accesses storage. In addition, LPM utility 550 initiates the creation of other monitoring threads (e.g., via monitoring thread module 506) on every other VIOS (e.g., including VIOS 112B) running on the (same) source server. Furthermore, LPM utility 550 initiates the creation of monitoring threads on second VIOS on a target server (e.g., CEC 110B) from which the client subsequently accesses (i.e., is expected to subsequently access) storage once the (migrated) client is running on the target server (e.g., CEC 110B). Similar to the creation of other monitoring threads on the source server, LPM utility 550 creates a collection of other monitoring threads on every other VIOS (e.g., including VIOS 112D) on the target server. LPM utility 550 provides current/up-to-date information about a particular LPM event by enabling an appropriate monitoring thread(s) to create or update a respective row in the "mobility table" (e.g., table 510) in database 520 of VIOS DB 140. In one embodiment, mobility table 510 may be associated with a database stored within distributed storage repository 150. Monitoring threads continually check the state of the LPM by communicating with hypervisor 125. If a particular VIOS (e.g., VIOS 512A) is in a failed condition (or is experiencing on of several pre-defined failure conditions;), LPM utility 550 provides notification of the partition failure to other functioning nodes/VIOSes. LPM utility 550 enables a functioning monitoring thread to update the LPM status within the table 510. In particular, a last monitoring thread may perform update operations within the database based on an indication that there are nodes on the first server that are in a failed state. The utilization of mobility table 510 to efficiently provide multi-node failure recovery in clustered partition mobility is further described in FIG. 6.

FIG. 6 illustrates an example mobility table that is updated by a monitoring thread during an LPM event, according to one embodiment. Table 510 provides information about three example LPM events within three rows of Table 510, respectively. In table 510, a first monitoring thread associated with monitor thread module 504 creates row 602 when an LPM event associated with LPAR 114A is initiated. In one embodiment, LPM utility 550 enables a (relational) database to point to a client partition table to keep track of the client partition and provide information about the client (e.g., "client1"). Furthermore, LPM utility 550 enables the database to be mapped to several client partition tables, one for each VIOS that is involved in the LPM event and/or is running on the source server. In the database system for cluster VIOSes, these client partition tables may collectively be referred to as the client mobility table. In one embodiment, LPM utility 550 detects the start of an LPM event and enables a particular monitoring thread to create the row in mobility table 510. In one embodiment, LPM utility 550 determines whether a particular LPM event already has a row reserved in a mobility table. If the particular LPM event has not yet been entered into the mobility table, LPM utility 550 enables the first monitoring thread of the VIOS on which the LPM is initiated to create the appropriate row in mobility table 510. If the particular LPM event has been previously entered into the mobility table, LPM utility 550 enables the first monitoring thread or other appropriate monitoring thread (e.g., a last monitoring thread) to update the respective row of mobility table 510.

In updated/created row 502, LPM utility 550 enables the storage of information about (a) the server (e.g., CEC 110A) upon which the monitoring thread is based, (b) the client (e.g., "client1" controlling/utilizing LPAR 114A) for which the associated LPM is monitored by the monitoring thread, and (c) the current state of node/VIOS (i.e. whether the node/VIOS is running or has crashed) corresponding to the monitored LPM. Row 502, for example, indicates that LPAR1 is currently "running".

Since a first monitoring thread ceases to exist in the event that the partition (e.g., VIOS 512A and associated LPAR) goes down, LPM utility 550 keeps the state field current at the database (e.g., VIOS DB 140) by the functions provided by cluster aware DPS 100. That is, if the cluster recognizes a node failure, the cluster updates the state field within the appropriate row of the VIOS table to indicate "failed." Monitoring threads continually check the state of the LPM by communicating with hypervisor 125. If a migration is terminated, the first monitoring thread performs certain actions that include possibly cleaning up storage resources and removing a respective row from mobility table 510. The first monitoring thread performs these expected and required functions until a node (VIOS) fails (and, as a consequence, the first monitoring thread also fails) during LPM.

When the first monitoring thread fails (e.g., because of a VIOS failure condition), LPM utility 550 employs other monitoring threads which remain functional within the same CEC to do the work that the failed first monitoring thread cannot perform, as follows: when a monitoring thread is notified that the LPM operation is over (complete or failed), the monitoring thread is also supplied with a count of how many other threads on the server are currently monitoring the migration. If the notified monitoring thread is the last, LPM utility 550 enables the "last" monitoring thread to query mobility database table 510 to determine if there are any nodes on the same server in the failed/crashed state. For any entries that the (last) monitoring thread finds in the crashed state (e.g., LPAR2 of (second) row 504), the last monitoring thread performs operations needed to keep the database current/consistent and then removes the row from table 510.

Accordingly, multiple node failures are tolerated provided at least a single node involved in the LPM operation survives (and provides a "last" monitoring thread). In one embodiment, LPM utility 550 is able to roll back migration to a particular stage of the migration process. Thus, for example, in response to the LPM operation having ended as a result of a failure condition, the utility returns to a particular stage of a corresponding migration process in order to resume and complete the mobility operation. If the LPM process fails, LPM utility 550 may trigger a termination of the use of resources at the target server. On the other hand, if the LPM process succeeds, LPM utility 550 may terminate the use of resources at the source server. As a result of the cluster awareness features and characteristics of DPS 100, the entry of third row 506 in table 510 of the same, shared VIOS DB 140 indicates that a particular partition (i.e., LPAR3) that is involved in an LPM event and is based on a different server (e.g., CEC 110B) is also being monitored by a monitoring thread within the cluster (i.e., DPS 100).

Figure 7:
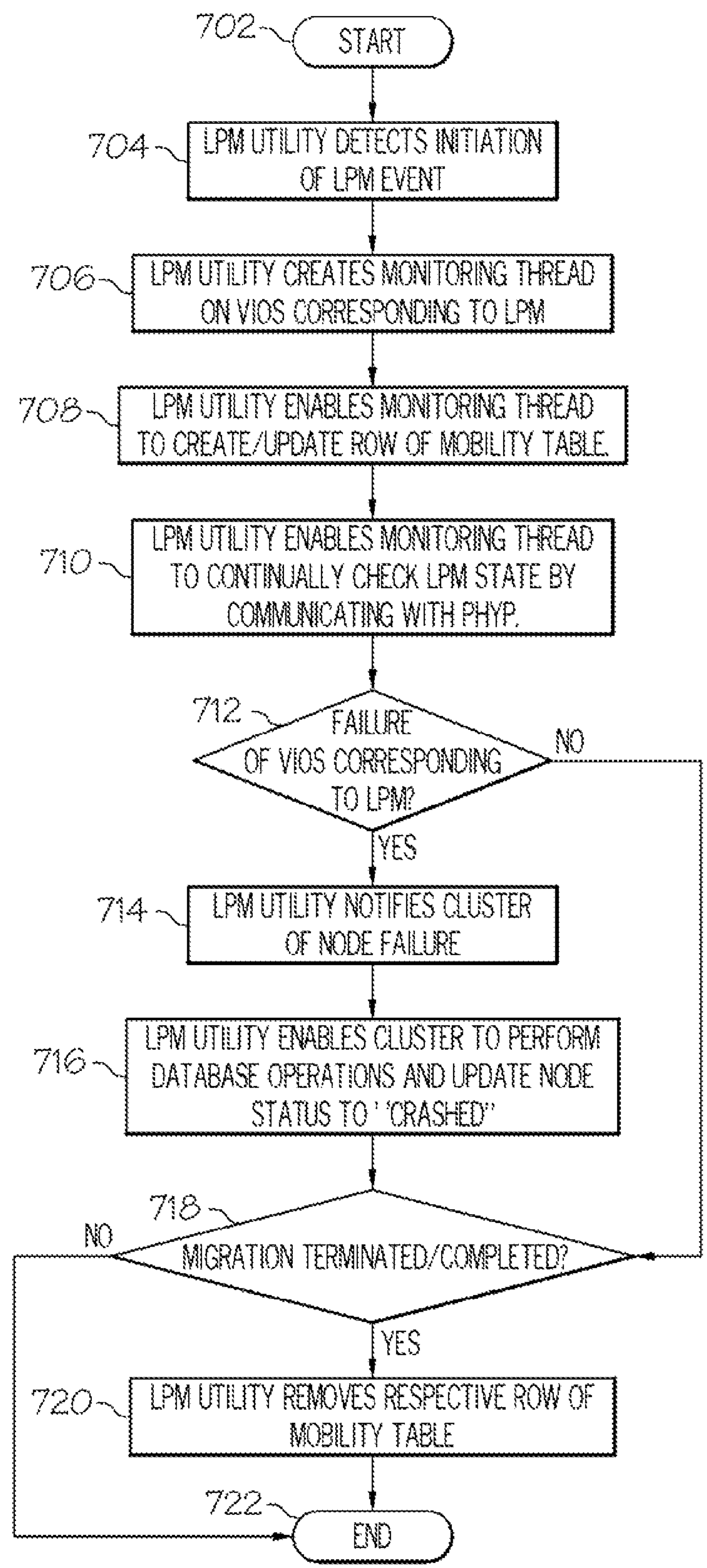
FIG. 7 is a high level logical flowchart of an exemplary method by which a VIOS cluster monitors an LPM event, updates a mobility table and provides recovery from node failure, according to one embodiment.
Figure 8:
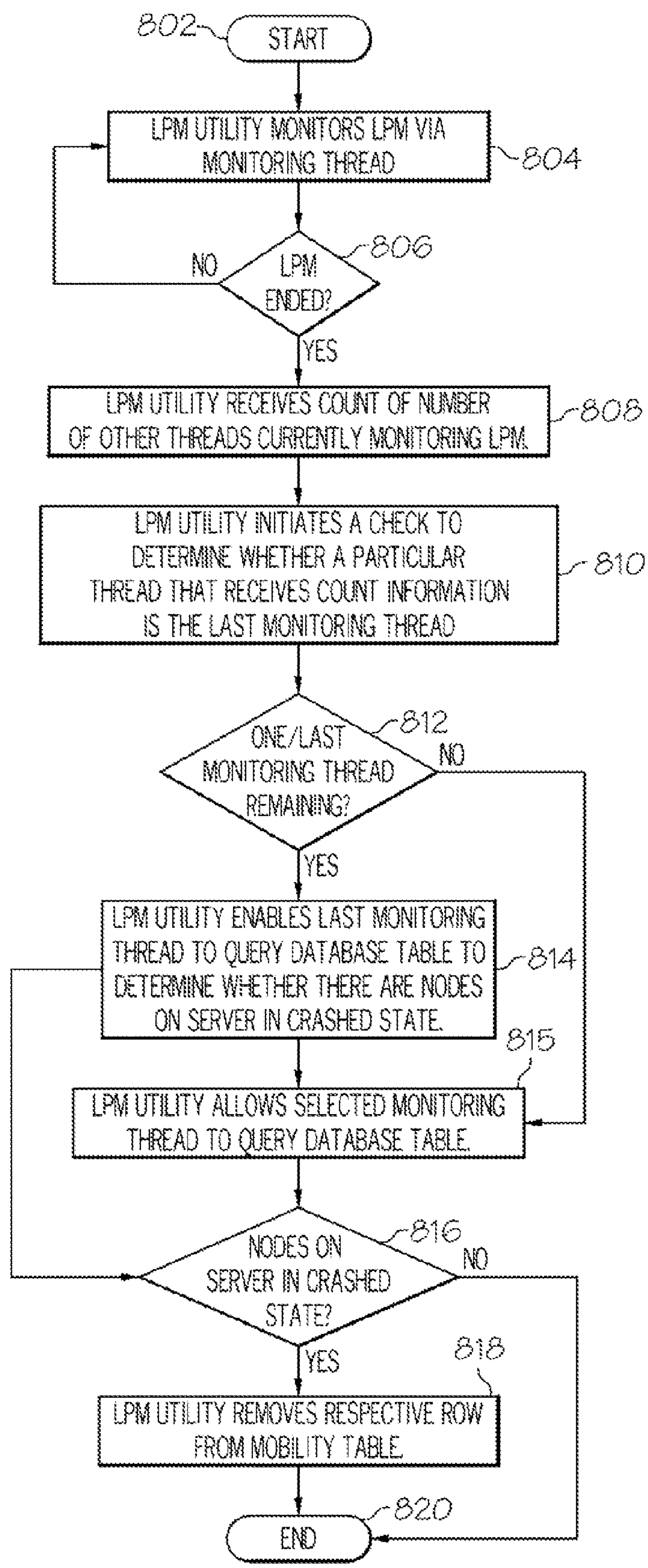
FIG. 8 is a high level logical flowchart of an exemplary method by which the VIOS cluster utilizes a monitoring thread which remains functional (active) after a first monitoring thread has failed to keep a database current and provide database consistency, according to another embodiment.

FIGS. 7-8 are flow charts illustrating various methods by which the above processes of the illustrative embodiments are completed. Although the methods illustrated in FIGS. 7-8 may be described with reference to components and functionality illustrated by and described in reference to FIGS. 1-6, it should be understood that this is merely for convenience and alternative components and/or configurations thereof can be employed when implementing the various methods. Certain portions of the methods may be completed by LPM utility 550 executing on one or more (virtual) processors (CPU 206A) within VIOS 112 (FIG. 1 or 2) or on processing resources of management tool 180 (within management console 175) or DB 140. The executed processes then control specific operations of or on CECs 110, client LPARs 114, VIOSes 112, DB 140 and/or distributed data store 150. For simplicity is describing the methods, all method processes are described from the perspective of either/both LPM utility 550 and VIOS/node 112.

FIG. 7 illustrates the method by which a VIOS cluster monitors an LPM event, updates a mobility table and provides recovery from node failure, according to one embodiment. The method begins at initiator block 702 and proceeds to block 704 at which LPM utility 550 detects the initiation of an LPM event. At block 706, LPM utility 550 initiates creation of a first monitoring thread on the VIOS corresponding to the LPM event and other monitoring threads on VIOSes on the source server from which the client currently accesses storage. At block 708, LPM utility 550 enables the first monitoring thread to update/create a row of mobility table 510. At block 710, LPM utility 550 initiates continual checks of the LPM state by communicating with PHYP via one or more monitoring threads. At block 712, LPM utility 550 detects failure of the node/VIOS corresponding to the LPM event. At block 714, LPM utility 550 notifies the cluster of the node failure. LPM utility 550 enables the cluster and, in particular, the other monitoring threads on VIOSes on the source server to update the LPM status to crashed, as shown at block 716. At decision block 718, LPM utility 550 determines whether the LPAR migration is successfully completed or terminated. If LPM utility 550 determines that the LPAR migration is terminated or successfully completed, LPM utility 550 removes the corresponding row from mobility table 510, as shown at block 720. If LPM utility 550 determines that the LPAR migration is not terminated or successfully completed, the process moves to block 722 at which block the process ends.

FIG. 8 illustrates the method by which the VIOS cluster utilizes a monitoring thread which remains functional/active after a first monitoring thread has failed to keep a database current and provide database consistency, according to one embodiment. The method begins at block 802 and proceeds to block 804 at which LPM utility 550 monitors an LPM event via a (first) monitoring thread. At decision block 806, LPM utility 550 determines whether the LPM event is ended (i.e., either terminated or completed). If LPM utility 550 determines that the LPM event is ended, LPM utility 550 receives a count indicating the quantity of other threads currently monitoring the LPM, as shown at block 808. If LPM utility 550 determines that the LPM event has not ended, the process returns to block 804. At block 810, LPM utility 550 initiates a check to determine whether a particular monitoring thread that receives count information is the last monitoring thread. At decision block 812, LPM utility 550 determines whether the count information was received by a single/last remaining (and functioning) monitoring thread. If at decision block 812 LPM utility 550 determines that the count information was received by the last monitoring thread, LPM utility 550 enables the last monitoring thread to query the database/table to determine whether there are nodes on server in failed/crashed state, as shown at block 814. In one embodiment, if at decision block 812 LPM utility 550 determines that the count information was not received by the last monitoring thread (i.e., more than one functional monitoring thread remain) LPM utility 550 selects a particular monitoring thread to query the database/table to determine whether there are nodes on server in crashed state, as shown at block 815. At decision block 816, LPM utility 550 determines whether there are VIOSes/nodes on the server in the failed/crashed state. If LPM utility 550 determines that there are VIOSes/nodes on the server in the failed/crashed state, LPM utility 550 removes the row (via the last or selected monitoring thread) corresponding to the one or more failed/crashed VIOSes from the mobility table 510, as shown at block 818. If LPM utility 550 determines that there are no VIOSes/nodes on the server in the crashed state, the process moves to block 820 at which block the process ends.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing electronic complex of a cluster-aware data processing system comprising:

a processor;

a distributed data storage;

an input/output (I/O) interface coupled to an external network; and a memory coupled to the processor, wherein the memory includes:

a hypervisor;

a plurality of operating system (OS) partitions; and a utility which when executed on the processor enables the processor to:

activate a first monitoring thread on a first Virtual Input/Output Server (VIOS) of one or more VIOSes of a first server of the cluster-aware data processing system to track a status of a live partition mobility (LPM) event;

record information about the LPM event within a shared database by using the first monitoring thread;

in response to the first VIOS sustaining a failure condition, identify one or more functioning monitoring threads that continue to function on the first server, wherein the failure condition results in a loss of LPM event monitoring by the first monitoring thread;

determine whether the one or more functioning monitoring threads is a single, last monitoring thread; and in response to receiving an indication that identifies at least the first VIOS of the one or more VIOSes on the first server as being in failed state, perform, via the last monitoring thread:

a cleanup of one or more storage resources of the first VIOS; and one or more update operations on a corresponding mobility table within the shared database, the one or more update operations including one or more of: operations needed to keep the shared database consistent and current, removal of corresponding row/entry associated with the first VIOS from the corresponding mobility table, and one or more other maintenance operations.

2. The computing electronic complex of claim 1, wherein the functions for activating a first monitoring thread further comprises functions to:

detect an initiation of the LPM event; and in response to detecting the initiation of the LPM event, create one or more of: the first monitoring thread on the first VIOS on the first server, a first set of monitoring threads on other VIOSes of the one or more VIOSes on the first server, and a second set of monitoring threads on each of one or more VIOSes on a second, target server.

3. The computing electronic complex of claim 1, wherein the functions for recording further comprises functions to:

record information about the LPM event into the mobility table using the monitoring thread, wherein the recorded information includes information about one or more of: a client; the server; and the status of a corresponding VIOS participating in the LPM event;

determine when the LPM event is terminated; and in response to the LPM event being terminated, provide via the first monitoring thread one or more of: associated updates to storage resources; removal of a corresponding entry in a mobility table of the database; and other maintenance operations.

4. The computing electronic complex of claim 1, wherein the utility further executes to:

detect when the first VIOS has sustained the failure condition, wherein the first VIOS is associated with a virtualized client partition corresponding to the LPM;

in response to detecting that the first VIOS has sustained the failure condition and the first monitoring thread ceasing to exist, provide notification of the failed state of the first VIOS to a plurality of other functioning VIOSes within the cluster-aware data processing system; and enable one or more of the plurality of other functioning VIOSes to appropriately update LPM event status in the database.

5. The computing electronic complex of claim 1, wherein the utility further executes to:

initiate continual checks about the state of the LPM event by other monitoring threads via communication of the other monitoring threads with a hypervisor;

determine whether the LPM event is one of: terminated; completed; and in a failed state; and in response to the other monitoring threads being a single, last monitoring thread, initiate, via the last monitoring thread, a query of the database to determine whether there exists at least one VIOS of the one or more VIOSes that is in the failed state.

6. The computing electronic complex of claim 5, wherein the utility further executes to: in response to the LPM event having ended as a result of a failure condition, return to a particular stage of a corresponding migration process in order to resume and complete the mobility operation.

7. The computing electronic complex of claim 1, wherein the failed state of the first VIOS is at least one condition from among: the first VIOS no longer being capable of performing input/output (I/O) operations, the first VIOS going offline, and removal of the first VIOS.

8. The computing electronic complex of claim 1, wherein the utility further enables the processor to: in response to the first VIOS sustaining a failure condition, supply the one or more functioning monitoring threads with a count of how many threads are currently monitoring the LPM event.

9. The computing electronic complex of claim 1, wherein the failed state of the first VIOS is at least one condition from among: the first VIOS no longer being capable of performing input/output (I/O) operations, the first VIOS going offline, and removal of the first VIOS.

10. A computer program product comprising:

a computer readable storage apparatus; and program code on said computer readable storage apparatus that that when executed by a processor within a data processing system provides the functions of:

activating a first monitoring thread on a first Virtual Input/Output Server (VIOS) of one or more VIOSes of a first server of a cluster-aware data processing system to track a status of a live partition mobility (LPM) event;

recording information about the LPM event within a shared database by using the first monitoring thread;

in response to the first VIOS sustaining a failure condition, identifying one or more functioning monitoring threads that continue to function on the first server, wherein the failure condition results in a loss of LPM event monitoring by the first monitoring thread;

determining whether the one or more functioning monitoring threads is a single, last monitoring thread; and in response to receiving an indication that identifies at least the first VIOS of the one or more VIOSes on the first server as being in failed state, performing, via said last monitoring thread:

a cleanup of one or more storage resources of the first VIOS; and one or more update operations on a corresponding mobility table within the shared database, the one or more update operations including one or more of: operations needed to keep the shared database consistent and current, removal of corresponding row/entry associated with the first VIOS from the corresponding mobility table, and one or more other maintenance operations.

11. The computer program product of claim 10, wherein said program code for activating a first monitoring thread further comprises program code for:

detecting an initiation of the LPM event; and in response to detecting the initiation of the LPM event, creating one or more of: the first monitoring thread on the first VIOS on the first server, a first set of monitoring threads on other VIOSes of the one or more VIOSes on the first server, and a second set of monitoring threads on each of one or more VIOSes on a second, target server.

12. The computer program product of claim 10, wherein said program code for recording further comprises program code for:

recording information about the LPM event into the mobility table using the monitoring thread, wherein the recorded information includes information about one or more of: a client; the server; and the status of a corresponding VIOS participating in the LPM event; determining when the LPM event is terminated; and in response to the LPM event being terminated, providing via the first monitoring thread one or more of: associated updates to storage resources; removal of a corresponding entry in a mobility table of the database; and other maintenance operations.

13. The computer program product of claim 10, further comprising program code that causes the data processing system to:

detecting when the first VIOS has sustained the failure condition, wherein the first VIOS is associated with a virtualized client partition corresponding to the LPM;

in response to detecting that the first VIOS has sustained the failure condition and the first monitoring thread ceasing to exist, providing notification of the failed state of the first VIOS to a plurality of other functioning VIOSes within the cluster-aware data processing system; and enabling one or more of the plurality of other functioning VIOSes to appropriately update LPM event status in the database.

14. The computer program product of claim 10, further comprising program code that causes the data processing system to:

initiating continual checks about the state of the LPM event by other monitoring threads via communication of the other monitoring threads with a hypervisor;

determining whether the LPM event is one of: terminated; completed; and in a failed state; and in response to the other monitoring threads being a single, last monitoring thread, initiating via the last monitoring thread, a query of the database to determine whether there exists at least one VIOS of the one or more VIOSes that is in the failed state.

15. The computer program product of claim 14, further comprising program code that causes the data processing system to:

in response to the LPM event having ended as a result of a failure condition, returning to a particular stage of a corresponding migration process in order to resume and complete the mobility operation.

16. The computer program product of claim 10, further comprising program code that causes the data processing system to: in response to the first VIOS sustaining a failure condition, supplying the one or more functioning monitoring threads with a count of how many threads are currently monitoring the LPM event.

* * * * *